US007657120B2

(12) United States Patent
Aradhye

(10) Patent No.: US 7,657,120 B2
(45) Date of Patent: Feb. 2, 2010

(54) METHOD AND APPARATUS FOR DETERMINATION OF TEXT ORIENTATION

(75) Inventor: Hrishikesh B. Aradhye, Redwood City, CA (US)

(73) Assignee: SRI International, Menlo Park, CA (US)

( * ) Notice: Subject to any disclaimer, the term of this patent is extended or adjusted under 35 U.S.C. 154(b) by 17 days.

(21) Appl. No.: 11/844,555

(22) Filed: Aug. 24, 2007

(65) Prior Publication Data

US 2008/0175516 A1   Jul. 24, 2008

Related U.S. Application Data

(62) Division of application No. 10/764,655, filed on Jan. 26, 2004, now Pat. No. 7,286,718.

(51) Int. Cl.
G06K 9/46 (2006.01)
G06K 9/66 (2006.01)
G06K 9/40 (2006.01)
G06K 9/36 (2006.01)

(52) U.S. Cl. ................... 382/290; 382/190; 382/275
(58) Field of Classification Search ............... None
See application file for complete search history.

(56) References Cited

U.S. PATENT DOCUMENTS

| | | | |
|---|---|---|---|
| 4,685,141 A | | 8/1987 | Hoque et al. |
| 5,077,811 A | | 12/1991 | Onda et al. |
| 5,164,996 A | | 11/1992 | Pastor |
| 5,276,742 A | | 1/1994 | Dasari et al. |
| 5,278,918 A | * | 1/1994 | Bernzott et al. ............. 382/176 |
| 5,278,920 A | * | 1/1994 | Bernzott et al. ............. 382/176 |
| 5,381,489 A | * | 1/1995 | Bernzott et al. ............. 382/176 |
| 5,436,983 A | * | 7/1995 | Bernzott et al. ............. 382/229 |
| 5,469,514 A | | 11/1995 | Kawamura |
| 5,583,949 A | * | 12/1996 | Smith et al. ................. 382/199 |
| 5,854,853 A | | 12/1998 | Wang |
| 5,982,952 A | | 11/1999 | Nakashima |
| 5,987,171 A | * | 11/1999 | Wang ......................... 382/173 |

(Continued)

OTHER PUBLICATIONS

Lawrence Spitz, "Determination of the Script and Language Content of Document Images", IEEE Transactions on Pattern Analysis and Machine Intelligence, Mar. 1997 vol. 19 Issue 3, IEEE.*

(Continued)

*Primary Examiner*—Bhavesh M Mehta
*Assistant Examiner*—Nathan Bloom

(57) ABSTRACT

The present invention relates to a method for determining the orientation of text, so that the text can be correctly read. In one embodiment, the method analyzes the "open" portions of text characters to determine in which direction the open portions face. By determining the respective densities of characters opening in each direction (e.g., right or left), the method can establish in which direction the text as a whole is orientated. The present invention may be adapted for use in automated mail processing, to determine the orientation of checks in automated teller machine envelopes, or the orientation of scanned or copied documents, or documents sent via facsimile, or to determine the orientation of digital photographs that include text (e.g., road signs, business cards, driver's licenses, etc.), among other applications. A fast, substantially automatic determination of text orientation according to the present invention will reduce the labor expense and processing delay required for manual orientation.

13 Claims, 13 Drawing Sheets

U.S. PATENT DOCUMENTS

| | | | |
|---|---|---|---|
| 6,011,877 A * | 1/2000 | Ishikawa et al. | 382/290 |
| 6,038,342 A * | 3/2000 | Bernzott et al. | 382/173 |
| 6,148,119 A | 11/2000 | Takaoka | |
| 6,151,423 A | 11/2000 | Melen | |
| 6,411,743 B1 | 6/2002 | Koh et al. | |
| 6,532,303 B2 | 3/2003 | Saiga | |
| 6,577,763 B2 | 6/2003 | Fujimoto et al. | |
| 6,624,910 B1 | 9/2003 | Koh et al. | |
| 7,010,166 B2 * | 3/2006 | Ayshi et al. | 382/199 |
| 2002/0085758 A1 * | 7/2002 | Ayshi et al. | 382/199 |

OTHER PUBLICATIONS

Chen and Haralick, "An Automatic Algorithm for Text Skew Estimation in Document Images Using Recursive Morphological Transforms", IEEE International Conference on Image Processing, Proceedings ICIP-94, Nov 1994, pp. 139-143 vol. 1, IEEE.*

Tsang, Chris, "Development of Structural Deformable Model for Handwriting Recognition", Proeedings of the 14$^{th}$ International Conference of Pattern Recognition—vol. 2, IEEE 1998.

* cited by examiner

A Segment of Right Side Up Text

DAVID STRINGER-CALVERT
SRI INTERNATIONAL
333 RAVENSWOOD AVE
MENLO PARK, CA 94025

Result = Right Side Up, $C_L = 3$, $C_R = 21$, $C_R/C_L = 7.000000$

```
              R   GER C   L   ER
   R     ER            L
  333 R    E                 E
    E L   P RK  C
```

FIG. 6

A Segment of Upside Down Text

REDWOOD CITY, CA 94063
918 ARGUELLO STREET, APT. NO. 1
HRISHIKESH BALKRISHNA ARADHYE
(shown upside down)

Result = Upside Down, $C_L$ = 22, $C_R$ = 3, $C_L/C_R$ = 7.333333

FIG.12
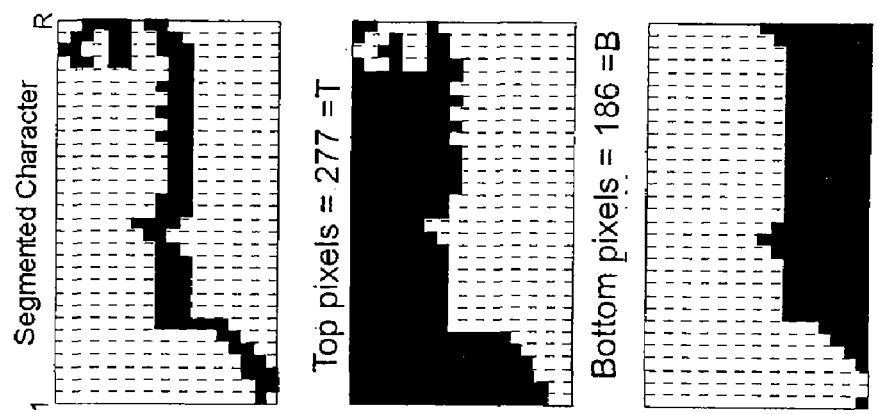
FIG.11
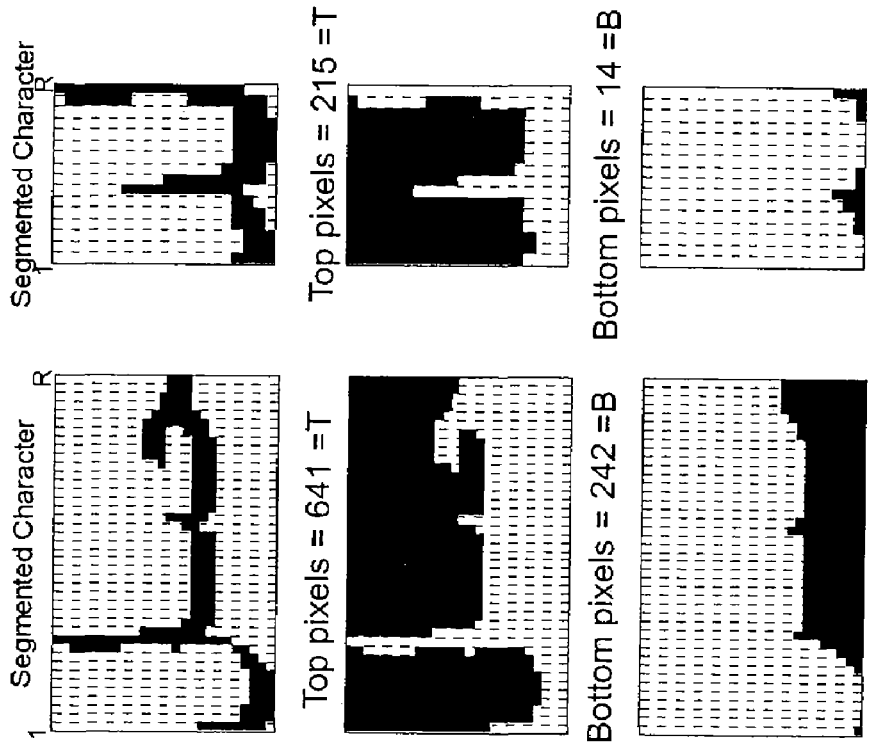
FIG.10
FIG.9

SAMPLE A

RESULTS A

FIG. 15

SAMPLE B

RESULTS B

Frequency of Occurrence of Alphabets in a Typical English Prose in Small Case

| Openness | Alphabets | Numbers | Frequency of Occurrence (%) |
|---|---|---|---|
| To the left | a, d, j, q | 4 | 11.64 |
| To the right | b, c, e, f, g, h, k, p, r, y | 10 | 37.65 |
| Neither | i, l, m, n, o, s, t, u, v, w, x, z | 14 | 50.71 |

FIG. 19

Frequency of Occurrence of Alphabets in a Typical English Prose in Capital

| Openness | Alphabets | Numbers | Frequency of Occurrence (%) |
|---|---|---|---|
| To the lef | J, Q | 2 | 0.53 |
| To the right | C, E, F, G, K, L, P, R | 8 | 34.07 |
| Neither | A, B, D, H, I, M, N, O, S, T, U, V, W, X, Y, Z | 16 | 65.4 |

METHOD AND APPARATUS FOR DETERMINATION OF TEXT ORIENTATION

CROSS REFERENCE TO RELATED APPLICATIONS

This application is a divisional of U.S. patent application Ser. No. 10/764,655, filed Jan. 26, 2004 now U.S. Pat. No. 7,286,718 which is herein incorporated by reference in its entirety.

REFERENCE TO GOVERNMENT FUNDING

This invention was made with Government support under contract number 512593-00-H-1092/3AAERD-03-D-4529 awarded by the United States Postal Service. The Government has certain rights in this invention.

FIELD OF THE INVENTION

The present invention relates to a method and apparatus for facilitating optical character recognition. More specifically, the present invention provides a new method that analyzes the directionality properties of text characters (e.g., letters, or words for connected scripts) to determine the orientation of the text.

BACKGROUND OF THE DISCLOSURE

Many conventional Optical Character Recognition (OCR) methods require that text be orientated right side up to be accurately read. However, numerous practical applications involve documents of unknown orientation; for example, as mail is collected in a mail collection box, the right side up orientation cannot be guaranteed. Similarly, when documents are scanned, photocopied, or received via facsimile, the orientation could be right side up or upside down, or sideways, or on an angle.

To address practical concerns such as these, a number of solutions have been put forth. For instance, optical character recognition may be performed in both directions (i.e., right side up and upside down) on a document, and the two (OCR) confidences may be used as indications as to whether the document is upside down or right side up. Alternatively, watermarks or magnetic ink may be used to mark a document in a way that facilitates a determination of orientation. A third solution relies on the fact that, statistically, English text comprises more "ascenders" (e.g., letters such as a lowercase b, d, or h, that have character strokes extending above a base line of text) than "descenders" (e.g., letters such as a lowercase p, q or j, that have character strokes extending below a base line of text). Thus, it is assumed that a document in which a greater number of characters have strokes extending above base lines of text, as opposed to below the base lines, is orientated right side up.

While such solutions have generally proven to be successful, their utility is limited to a very small number of situations. Those methods that are not computationally expensive or slow typically do assume prior knowledge of special formats, or will not work for documents that (a) comprise characters that are all capital letters (e.g., addresses, tax forms); (b) are written in italics; or (c) are printed in another language or alphabet.

Thus, there is a need in the art for a method and apparatus for determination of text orientation that is economical and efficient, and is capable of use in a variety of formats.

SUMMARY OF THE INVENTION

In one embodiment, the present invention relates to a method and apparatus for determining the orientation of text. In one embodiment, the present invention provides a new method that analyzes the directionality properties of text characters to determine the orientation of the text.

Specifically, in one embodiment, the inventive method analyzes the "open" portions of text characters to determine the direction in which the open portions face. By determining the respective densities of characters opening in each direction (e.g., right or left), the method can establish the direction in which the text as a whole is orientated. In one embodiment, a method is provided for determining the orientation of Roman script character text. In another embodiment, a method is provided for determining the orientation of non-Roman scripts, such as Pashto and Chinese scripts.

The present invention may be adapted for use in automated mail processing, to determine the orientation of checks in automated teller machine envelopes, or the orientation of scanned or copied documents, or documents sent via facsimile, or to determine the orientation of digital photographs that include text (e.g., road signs, business cards, driver's licenses, etc.), among other applications.

BRIEF DESCRIPTION OF THE DRAWINGS

The teachings of the present invention can be readily understood by considering the following detailed description in conjunction with the accompanying drawings, in which:

FIG. 6 illustrates orientation determination results for a representative English language address printed in all capital letters, wherein the address is orientated right side up;

FIG. 9 illustrates character directionality analyses for a representative Pashto character, performed according to the method defined in FIG. 8;

FIG. 10 illustrates character directionality analyses for another representative Pashto character, performed according to the method defined in FIG. 8;

FIG. 11 illustrates character directionality analyses for another representative Pashto character, performed according to the method defined in FIG. 8;

FIG. 12 illustrates character directionality analyses for another representative Pashto character, performed according to the method defined in FIG. 8;

FIG. 15 illustrates orientation determination results for a representative Pashto text passage, wherein the passage is orientated right side up;

FIG. 19 illustrates frequencies of openness for the lower case Roman alphabet; and FIG. 20 illustrates frequencies of openness for the upper case Roman alphabet.

To facilitate understanding, identical reference numerals have been used, where possible, to designate identical elements that are common to the figures.

DETAILED DESCRIPTION

The present invention relates to a method and apparatus for determining the orientation of text, for example text printed on a document that is being scanned or copied. In one embodiment, the present invention provides a method that, given a digital image of text, analyzes the directionality properties of the text characters to determine the orientation of the text. For the purposes of the invention, the term "character" may be an individual text letter (such as A, B or C) in printed or handwritten text, or an entire word comprising several linked text letters (such as a word written in connected scripts). The method focuses on the "open" portions of the individual text characters, i.e., the portions of certain characters (such as the Roman characters C, G or J) that are not closed, to determine the direction in which the text as a whole is facing.

Figure 18:
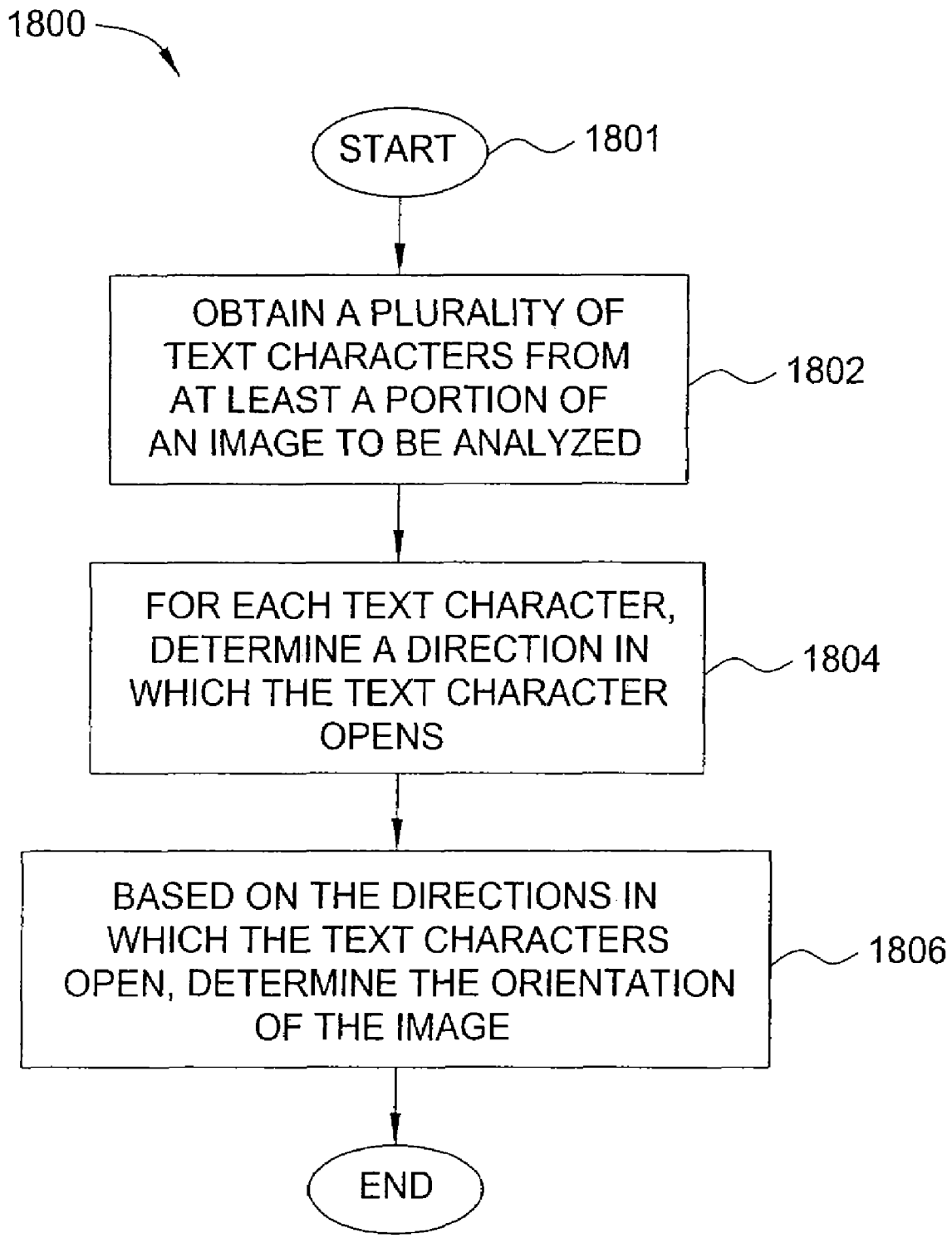
FIG. 18 illustrates one embodiment of a method for determining the orientation of an image or text according to the present invention.

FIG. 18 illustrates a flow chart that depicts one embodiment of a method 1800 for determining the orientation of text based on the directions in which individual text characters open. The method 1800 starts at step 1801 and proceeds to step 1802, where a plurality of text characters are obtained from at least a portion of the text or image to be analyzed. In step 1804, the method 1800 determines, for each of the plurality of text characters, a direction in which the text character opens. In step 1806, the method 1800 determines the orientation of the analyzed text or image based upon an analysis of the directions in which each of the individual text characters open.

Figure 1:
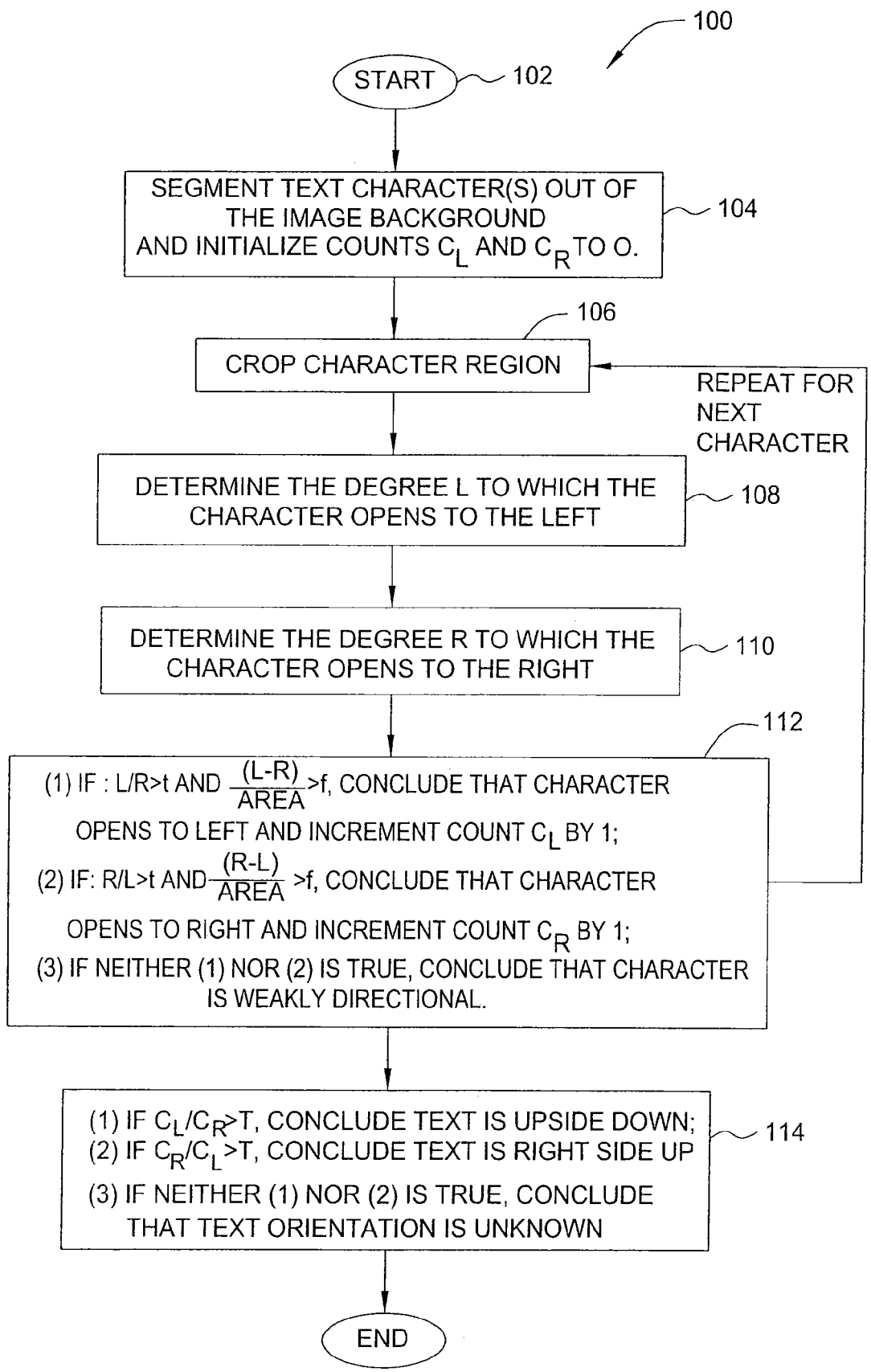
FIG. 1 illustrates a flow chart that depicts one embodiment of a method for determining the orientation of Roman text based on the directionality properties of the individual text characters.
Figure 2:
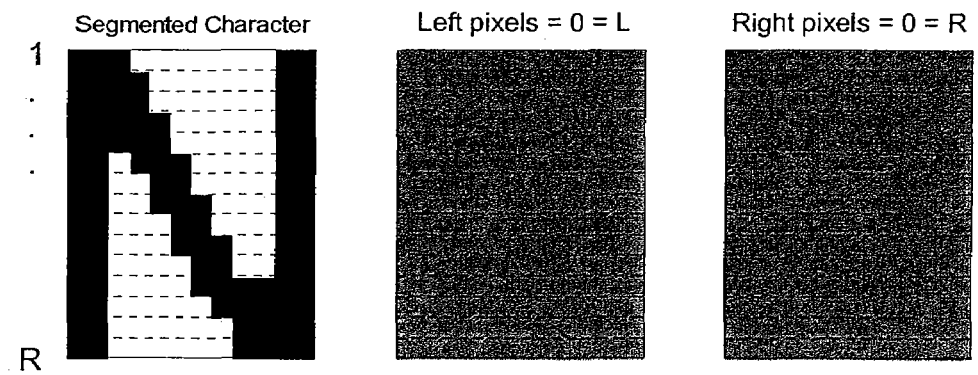
FIG. 2 illustrates intermediate results for character directionality analyses for one exemplary Roman letter performed in accordance with the method illustrated in FIG. 1.
Figure 3:
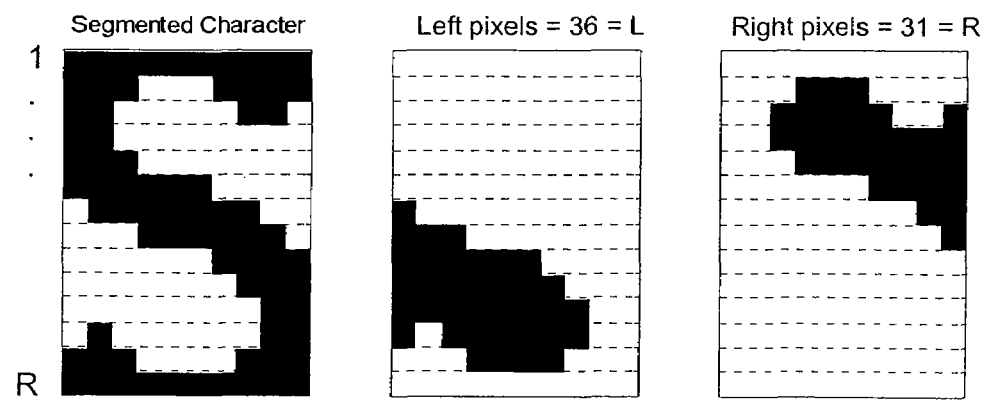
FIG. 3 illustrates intermediate results for character directionality analyses for another exemplary Roman letter performed in accordance with the method illustrated in FIG. 1.
Figure 4:
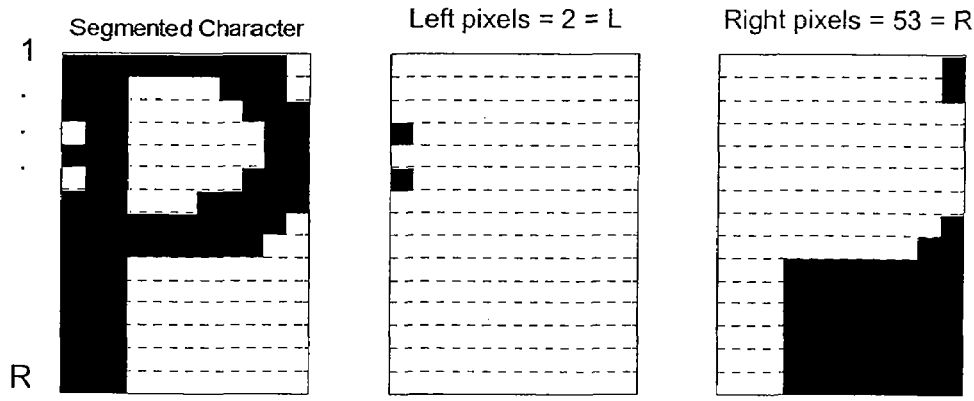
FIG. 4 illustrates intermediate results for character directionality analyses for another exemplary Roman letter performed in accordance with the method illustrated in FIG. 1.
Figure 5:
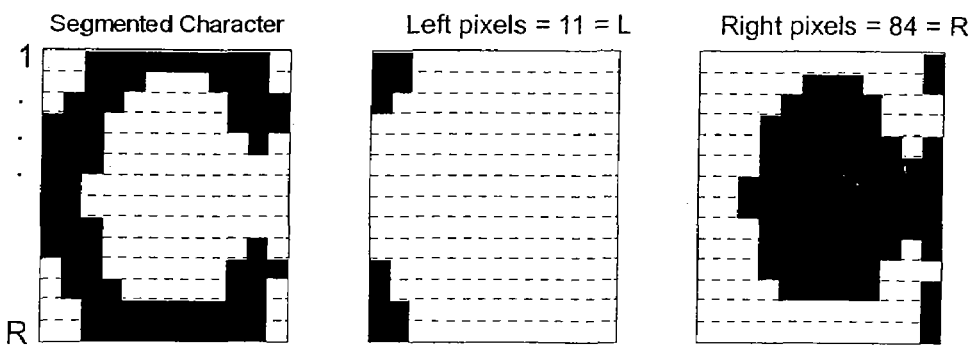
FIG. 5 illustrates intermediate results for character directionality analyses for another exemplary Roman letter performed in accordance with the method illustrated in FIG. 1.

FIG. 1 illustrates a flow chart that depicts one embodiment of a method 100 for determining the orientation of Roman text based on the horizontal directionality properties of the individual text characters. The method 100 is a refinement of the method 1800 illustrated in FIG. 18, and is adapted for analyzing text documents containing Roman scripts. The method 100 starts at step 102 and proceeds to step 104, where text characters (e.g., the foreground of the text document) from at least a portion of the total text to be analyzed are segmented out of the image background to define a character region (e.g., a region of the image comprising a plurality of rows and columns of pixels contained within a bounding box). In one embodiment, the text characters are segmented by a connected components analysis, whereby connected or linked pixels are identified as individual "characters". Small connected components of the character text are discarded, thereby removing substantial numbers of punctuation and other marks (e.g., periods, commas and noise, among others). Remaining connected components are each assumed to represent a "character" (e.g., a letter of the alphabet, or an alphanumeric symbol, among others). One illustrative example of a connected component analysis technique that may be adapted for use with the present invention is described in Brice, C., and C. Fennema: "Scene Analysis Using Regions," Artificial Intelligence, 1(3), pp. 205-226, 1970.

In steps 106 to 110, the method 100 analyzes selected character regions to determine whether the selected characters "open" on the left (e.g., the Roman characters J or d) or on the right (e.g., the Roman characters C, G, e or b). In step 106, the method refines the character region of a selected character. The character region comprises several rows of pixels that define the character. The top and bottom rows of pixels of the character region are cropped to achieve clear separation between right and left sides of the character region.

In step 108, the method 100 counts the total number of background pixels recursively connected with the background pixels of the leftmost column by connected component analysis. The degree L to which the character opens to the left is signified by this count of connected pixels, and is an integer greater than one.

In step 110, the method 100 counts the total number of background pixels recursively connected with the background pixels of the rightmost column by connected component analysis. The degree R to which the character opens to the right is signified by this count of connected pixels, and is an integer greater than one.

Referring back to FIG. 1, in step 112, the method 100 determines whether the selected character opens to the left or to the right. In step 112, the method 100 calculates the ratios L/R and R/L and the differences L−R and R−L. In a first scenario, if the ratio of L/R exceeds a predetermined threshold t, and if the difference (L−R)/Area exceeds a predetermined fraction f of the area of the bounding rectangle of the character region, then the method 100 concludes that the character opens to the left (e.g., the Roman character J when the text is right side up, or the Roman characters C and G when the text is upside down).

Alternatively, in a second scenario, if the ratio of R/L exceeds the predetermined threshold t, and if the difference (R−L)/Area exceeds a predetermined fraction f of the area of the bounding rectangle of the character region, then the method 100 concludes that the character opens to the right (e.g., the Roman characters C and G when the text is right side up, or the Roman character J when the text is upside down). In any given embodiment, the extent of noise and document skew dictate optimal values for t and f. In one illustrative embodiment, the predetermined threshold t is 2.5 and the predetermined fraction f is ¹⁄₁₀. If both conditions are not met for either of the first or second scenarios, then the character is considered weakly directional and is of limited utility in determining the orientation of the text. As illustrated in FIG. 1, steps 106-112 of the method 100 are then repeated for each character in the portion of text to be analyzed.

In step 114, the method 100 determines, after each character has been assessed to determine whether it opens to the left or to the right (e.g., in accordance with steps 106-112) whether the portion of text being analyzed is facing right side up or upside down. In step 114, the method 100 sums the number of characters opening to the left, $C_L$, and the number of characters opening to the right, $C_R$, in the entire analyzed portion of text. If the ratio $C_L/C_R$ is greater than a predefined threshold T, then the method 100 concludes that the text is orientated upside down. Alternatively, if the ratio $C_R/C_L$ is greater than the predefined threshold T, then the method 100 concludes that the text is orientated right side up. If neither ratio $C_L/C_R$ or $C_R/C_L$ is greater than T, the segment of text is considered weakly directional and its orientation is classified as "unknown" or "reject". In general, a large value for T (e.g., 5 or higher) will imply that a larger fraction of analyzed documents will be rejected (e.g., considered weakly directional). However, a very small value for T may also imply a greater chance of making an inaccurate orientation determination. This trade-off between maintaining a low reject rate and preserving accuracy dictates the preferred value of T for any given embodiment. In one embodiment, the predefined threshold T is 2.

FIGS. 19 and 20 are tables illustrating the frequency of occurrence of right- and left-opening characters in the Roman alphabet, for the lower (FIG. 19) and upper (FIG. 20) cases. The above described determination of text orientation is based on the observation that in the Roman script, the characters that open to the right are more frequent than the characters that open to the left; in essence, the method 100 determines whether a greater volume of characters in the analyzed portion of text open to the right or open to the left. If a greater volume opens to the right, the document is assumed to be right side up; if a greater volume opens to the left, it is assumed that the document is upside down. The method 100 therefore works for analyses of text consisting of all capital letters, as well as text consisting of all lowercase, or a combination of capital and lowercase letters. Furthermore, because the method 100 relies on directionality properties of the text characters, no watermarks, magnetic inks, prior knowledge of special formats, or multiple scans are necessary. In one embodiment, a major fraction of the computational expense of the above-described method for determining text orientation is consumed by the segmenting of each foreground character (e.g., by connected component analysis, as discussed with reference to step 104 in FIG. 1). However, since many modern OCR techniques require analogous character segmentation steps, this step does not represent a significant increase in computational costs over existing methods.

FIGS. 2-5 illustrate character directionality analyses for representative Roman characters, performed according to the method defined in steps 108 through 110. The leftmost images represent segmented Roman characters (e.g., the characters N, S, P and C), each character consisting of R horizontal rows of pixels. The foreground (character) pixels for each character N, S, P and C are illustrated in black in the leftmost images. The center images depict the background pixels (illustrated in black in the center images) that are recursively connected with the background pixels in the leftmost column, as in step 108. The rightmost images depict the background pixels (illustrated in black in the rightmost images) that are recursively connected with the background pixels in the rightmost column, as in step 110.

For each character N, S, P and C depicted in FIGS. 2-5, the degrees L and R to which each character N, S, P and C opens to the left and opens to the right are calculated as described in steps 108 and 110. Thus, once the area of each character's bounding rectangle is calculated, the method 100 will proceed to step 112 to determine whether the character opens to the left, opens to the right, or is weakly directional.

Figure 7:
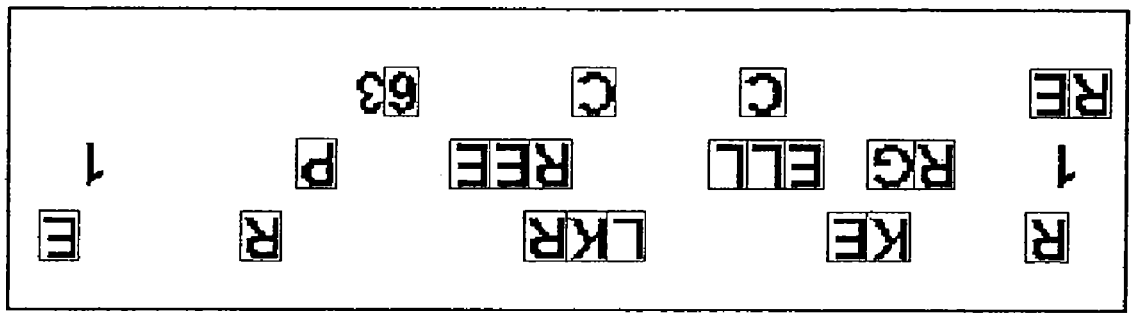
FIG. 7 illustrates orientation determination results for a representative English language address printed in all capital letters, wherein the address is orientated upside down.

FIGS. 6-7 illustrate orientation determination results for representative English language addresses printed in all capital letters. In FIG. 6, the sample text is orientated right side up. The results of the method 100 are illustrated below the sample text. Characters that open to the right are depicted in normal type, characters that open to the left are boxed, and characters that are weakly directional are not depicted in the results. $C_R/C_L$ is 21/3, or 7, for the results illustrated, leading correctly to the conclusion that the text is right side up based on a predefined threshold T.

In FIG. 7, the sample text is orientated up side down. $C_L/C_R$ is 22/3, or 7.33, for the results illustrated, leading correctly to the conclusion that the text is up side down based on a predefined threshold T.

Figure 8:
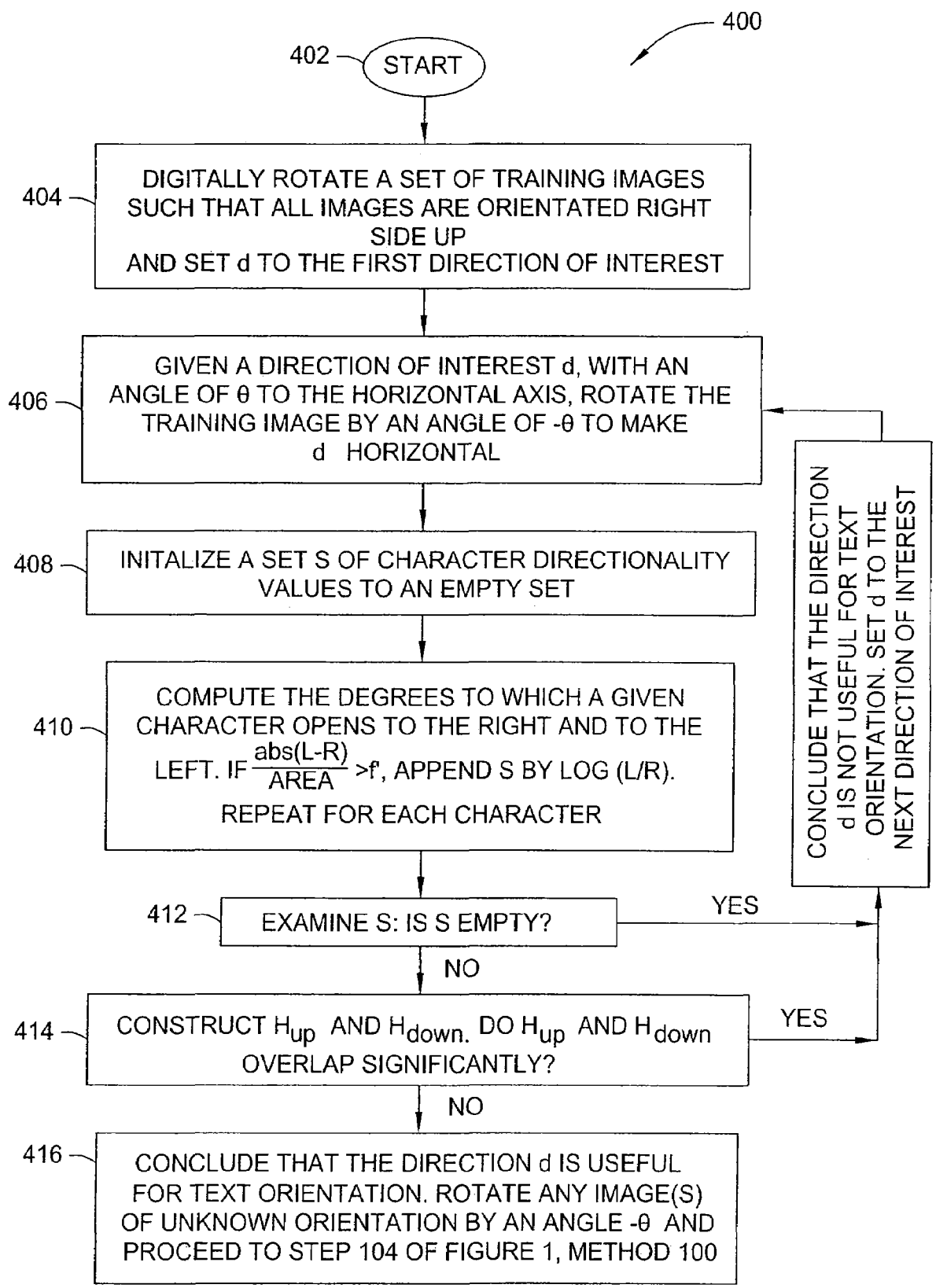
FIG. 8 illustrates a flow chart that depicts one embodiment of a method for determining the orientation of non-Roman text based on the directionality properties of the individual text characters.

FIG. 8 illustrates a flow chart that depicts one embodiment of a method 400 for determining the orientation of non-Roman (e.g., Pashto, Chinese, Cyrillic, etc.) text based on the directionality properties of the individual text characters. Many non-Roman scripts do not display the strong horizontal directionality on which the method 100 (illustrated in FIG. 1) depends. However, given a training set of one or more digital images of the non-Roman text of known orientation, the method 400 can determine and exploit basic character directionality properties in a manner similar to the method 100 to determine the orientation of a subsequent set of text. In other words, it is necessary to determine a dominant character orientation (e.g., open left, open right, open on an angle, etc.) for a particular script.

The method 400 starts at step 402 and proceeds to step 404, where the training images are digitally rotated to orientate the text right side up. In steps 406 to 416, the method 400 characterizes the directionality properties of the script under investigation. Specifically, in step 406, the method 400 is given a first direction of interest $d_1$ with an angle of $\theta$ to the horizontal axis, and the method 400 rotates the training image by an angle of $-\theta$, so that the direction of interest $d_1$ is now horizontal. In step 408, the method 400 initializes a set S of character directionality values to an empty set.

In step 410, the method 400 computes the degrees L and R to which each character is open to the left and to the right, respectively, in the manner described with reference to steps 108 through 112 of the method 100. In step 410, the method 400 calculates the absolute difference abs (L−R). If abs (L−R)/Area is greater than a predefined fraction f' of the area of the character's bounding rectangle, the method 400 appends the set S by the value log (L/R). In one embodiment, the predefined fraction is 1/10.

In step 412, the method 400 examines the set S. If the method 400 determines that the step S is still empty, the method 400 concludes that no information is available about character directionality in the direction of $\theta$, and the method 400 proceeds to analyze a next direction of interest $d_n$ (wherein n is an integer greater than one representing the total number of directions of interest), in accordance with steps 406 through 410 detailed above. If the method 400 concludes that the set S is not empty, the method 400 constructs a histogram, $H_{up}$, of the elements of the set S in step 414. The histogram $H_{up}$ reflects the character directionality distribution in the direction of $\theta$ for right side up images. A mirror of the histogram $H_{up}$ at the y axis (i.e., log (L/R)=0), denoted as $H_{down}$, reflects the character directionality distribution in the direction of $\theta$ for upside down images.

In step 414, the method 400 determines the extent, e, to which the histograms $H_{up}$ and $H_{down}$ overlap, defined as follows. Let $A_{up}$ denote the area under the histogram $H_{up}$, and let $A_{down}$ denote the area under the histogram $H_{down}$. The extent of overlap, e, is the ratio $(A_{up} \cap A_{down})/(A_{up} \cup A_{down})$. If the histograms $H_{up}$ and $H_{down}$ overlap significantly, e.g., if e is greater than a predefined threshold E, the method 400 concludes that the character directionality as represented by the ratio L/R will not yield an accurate determination of character orientation in the direction of θ, and the method 400 proceeds to a next direction of interest $d_n$. In one embodiment, the predefined threshold E is 0.3.

Alternatively, if the histograms $H_{up}$ and $H_{down}$ do not overlap significantly (e.g., e≦E), the method 400 concludes that the character directionality in the direction of θ can be characterized effectively and used for the purpose of determining text orientation. In this case, when the system is presented with an image of unknown orientation, it is first rotated by an angle of −θ, and then subjected to the method 100 as described with reference to FIG. 1 to determine its orientation.

FIGS. 9-12 illustrate character directionality analyses for representative Pashto characters, performed according to the method defined in steps 406 through 410. As illustrated, the Pashto characters do not show strong directional properties in the horizontal direction (i.e., left to right); however, the illustrated Pashto characters do show strong directional properties in the vertical direction (i.e., top to bottom). The topmost images represent segmented Pashto characters. The foreground (character) pixels for each character are illustrated in black in the topmost images. The center images depict the background pixels (illustrated in black in the center images) that are recursively connected with the background pixels in the topmost row, as in an adapted step 410. The bottommost images depict the background pixels (illustrated in black in the bottommost images) that are recursively connected with the background pixels in the bottommost row, as in an adapted step 410. For each character depicted in FIGS. 9-12, the degrees T and B to which each character opens to the top and opens to the bottom are calculated as described in steps 108 and 110 of FIG. 1.

Figure 13:
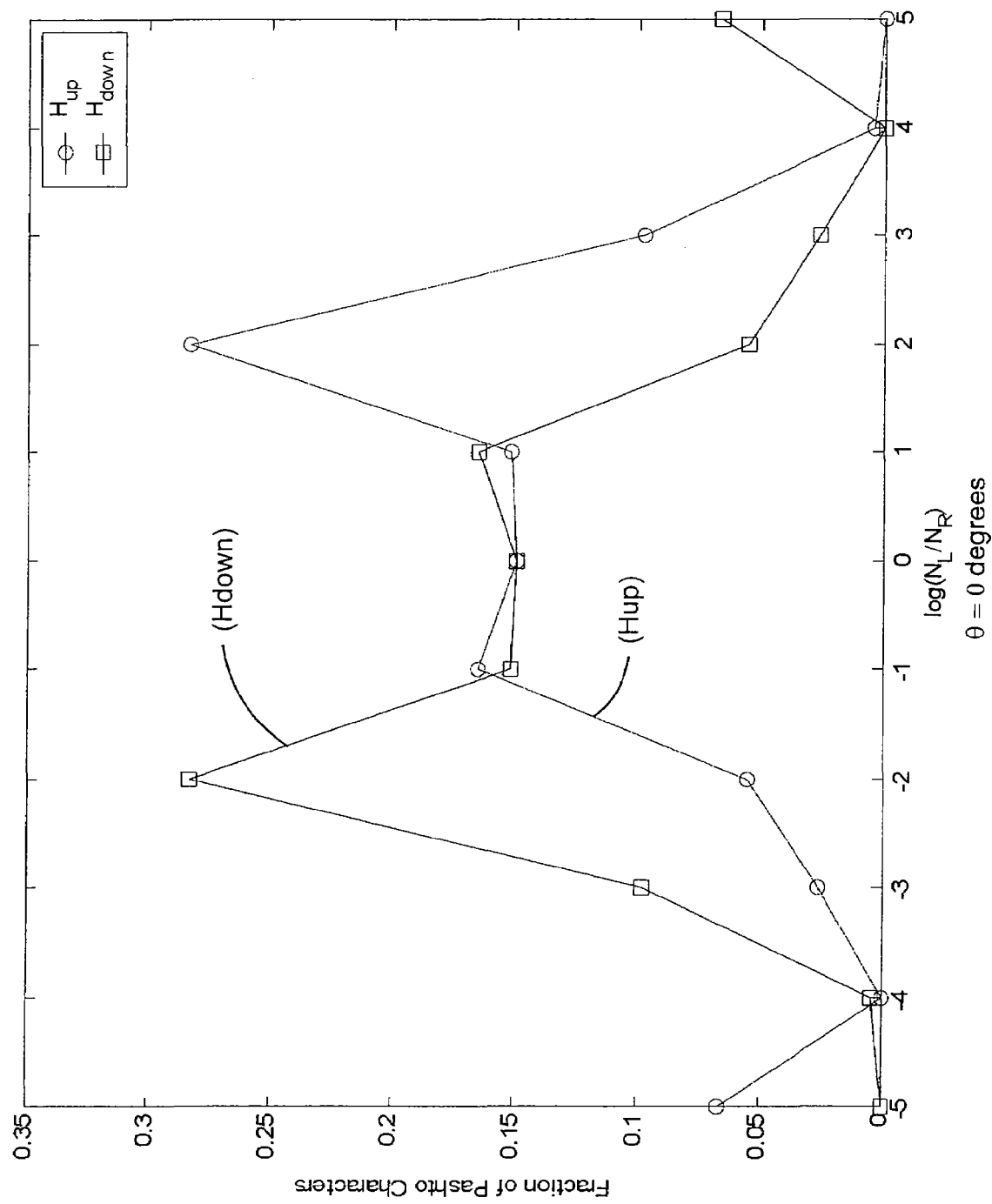
FIG. 13 illustrates a set of exemplary histograms depicting character directionality values.
Figure 14:
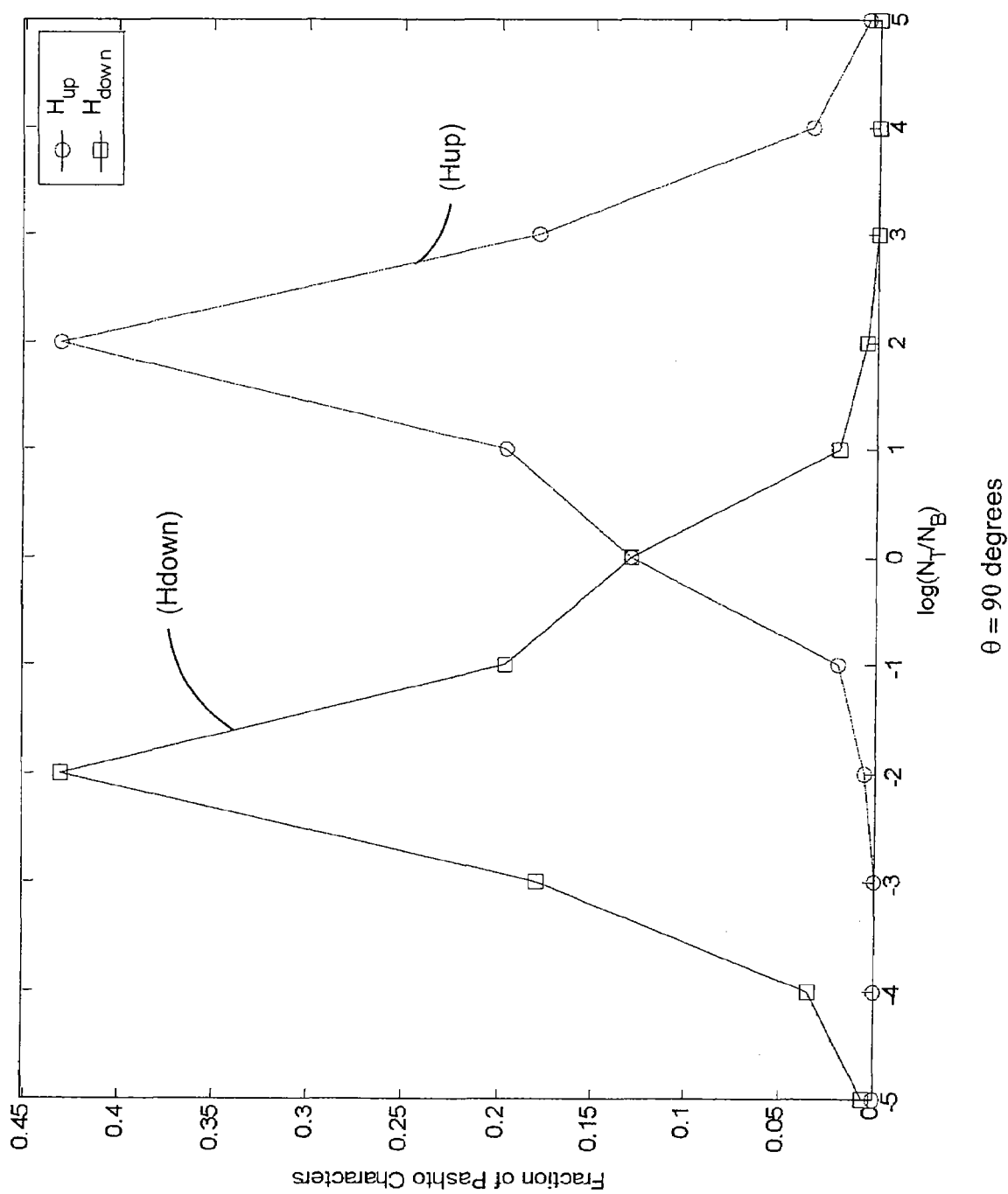
FIG. 14 illustrates another set of exemplary histograms depicting character directionality values.

FIG. 13 illustrates a set of representative histograms $H_{up}$ and $H_{down}$ computed for the horizontal (e.g., θ=0 degrees) directional properties of a body of Pashto text, in accordance with step 414 of the method 400. Since the two histograms $H_{up}$ and $H_{down}$ illustrated in FIG. 13 overlap significantly (e.g., e=0.446), it can be seen that the representative Pashto text does not have strong directional properties in the horizontal direction, as established by FIGS. 9-12. Thus, in accordance with step 414 of method 400, a set of histograms is computed in FIG. 14 for a second direction of interest, i.e., the vertical direction where θ=90 degrees. It can be seen that the representative Pashto text does have strong directional properties in the vertical direction, as the histograms $H_{up}$ and $H_{down}$ do not overlap significantly (e.g., e=0.098). Thus, FIGS. 13 and 14 corroborate the findings of FIGS. 9-12.

Figure 15:
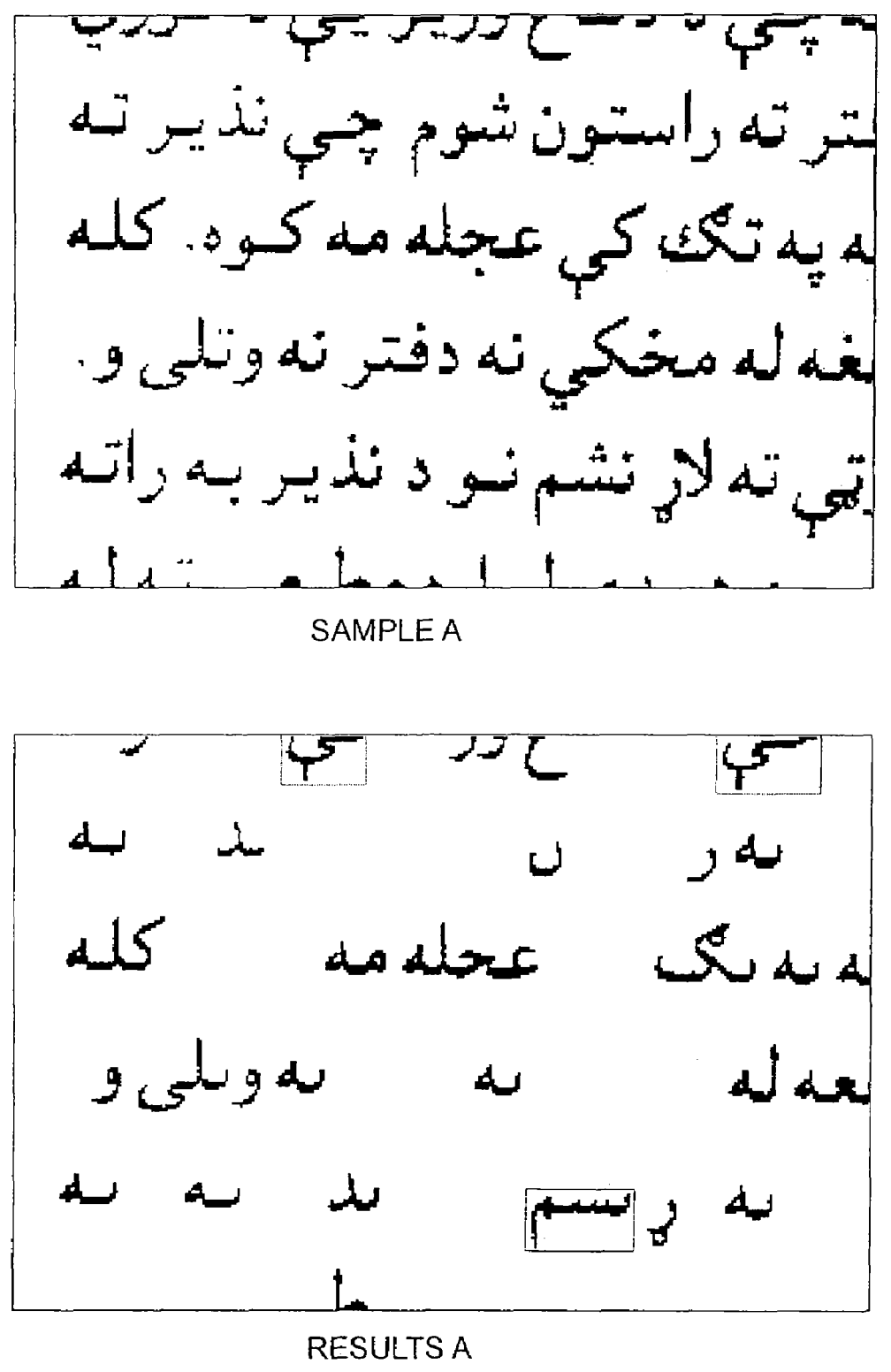
Figure 16:
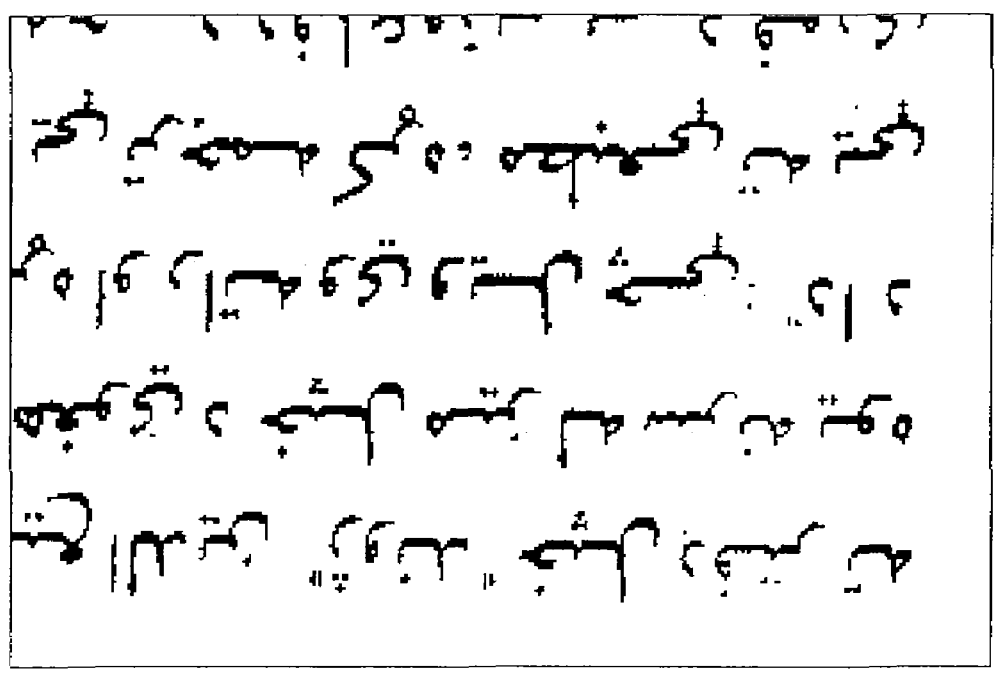
FIG. 16 illustrates orientation determination results for a representative Pashto text passage, wherein the passage is orientated upside down.
Figure 16:
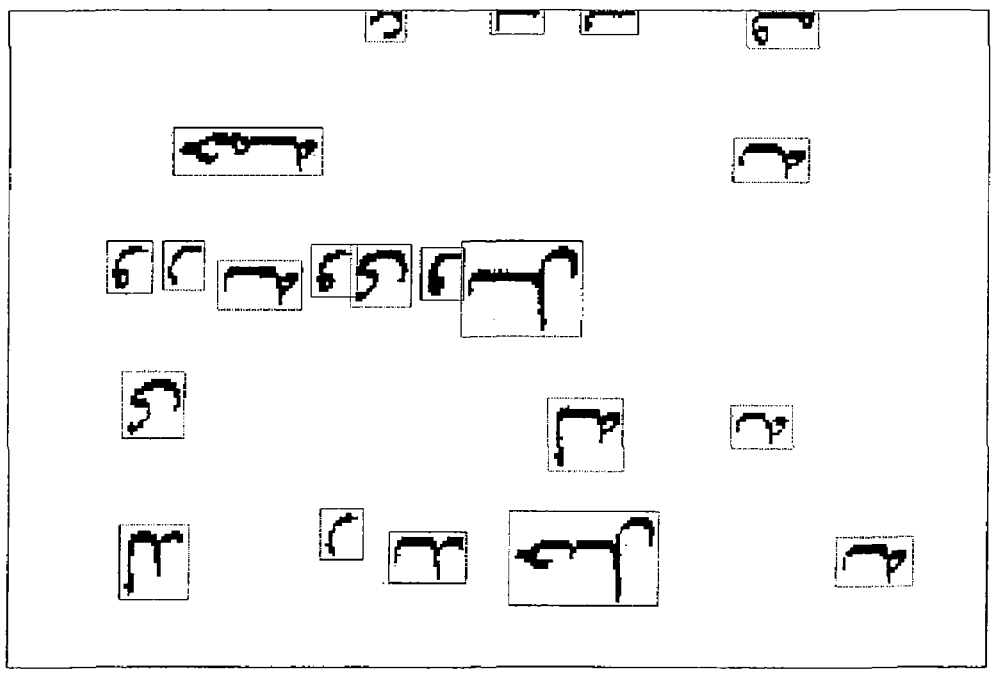

FIGS. 15-16 illustrate orientation determination results for representative Pashto language texts in which the vertical directionality of the Pashto characters is successfully relied upon. In FIG. 15, the sample text is orientated right side up. The results of the method 400 are illustrated to the right of the sample text. Characters that open upward are boxed, characters that open downward are depicted in normal type, and characters that are weakly directional are not depicted in the results. In FIG. 16, the sample text is orientated up side down, the results are depicted to the right. In both FIG. 15 and FIG. 16, the method 400 correctly determined the orientation of the original text.

Figure 17:
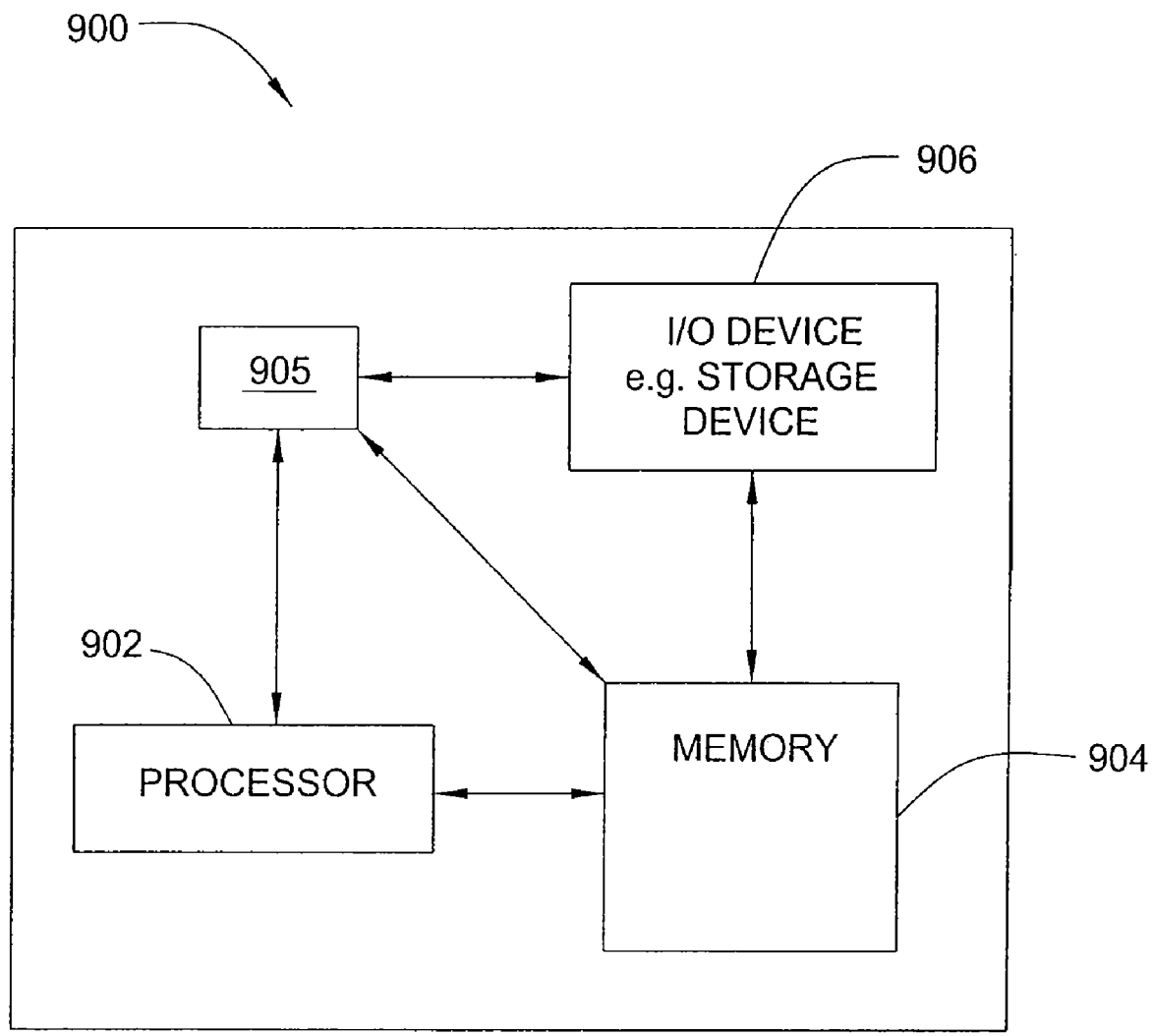
FIG. 17 illustrates an embodiment of the present invention implemented using a general purpose computing device.

FIG. 17 is a high level block diagram of the present invention implemented using a general purpose computing device 900. It should be understood that the digital scheduling engine, manager or application (e.g., for determining the orientation of text characters) can be implemented as a physical device or subsystem that is coupled to a processor through a communication channel. Therefore, in one embodiment, a general purpose computing device 900 comprises a processor 902, a memory 904, a character orientation recognizer or module 905 and various input/output (I/O) devices 906 such as a display, a keyboard, a mouse, a modem, and the like. In one embodiment, at least one I/O device is a storage device (e.g., a disk drive, an optical disk drive, a floppy disk drive).

Alternatively, the digital scheduling engine, manager or application (e.g., character orientation recognizer 905) can be represented by one or more software applications (or even a combination of software and hardware, e.g., using Application Specific Integrated Circuits (ASIC)), where the software is loaded from a storage medium (e.g., I/O devices 906) and operated by the processor 902 in the memory 904 of the general purpose computing device 900. Thus, in one embodiment, the character orientation recognizer 905 for determining the orientation of a text document described herein with reference to the preceding Figures can be stored on a computer readable medium or carrier (e.g., RAM, magnetic or optical drive or diskette, and the like).

Thus, the present invention represents a significant advancement in the field of optical character recognition. A method is provided that focuses on the open portions of text characters to accurately and efficiently determine the orientation of a given text document. The method is effective for use with various formats, include all caps formats, and with various languages and scripts. The present invention may be adapted for use in automated mail processing, to determine the orientation of checks in automated teller machine envelopes, or the orientation of scanned or copied documents, or documents sent via facsimile, or to determine the orientation of digital photographs that include text (e.g., road signs, business cards, driver's licenses, etc.), among other applications. A fast, substantially automatic determination of document orientation (e.g., for letters), as described herein, will significantly reduce the labor expense and processing delay required for manual orientation.

Although various embodiments which incorporate the teachings of the present invention have been shown and described in detail herein, those skilled in the art can readily devise many other varied embodiments that still incorporate these teachings.

What is claimed is:

1. A method for determining a dominant character orientation for a given script, comprising steps of:
   using a processor to perform steps comprising:
   providing a set of training images of said script;
   orientating said set of training images right side up;
   calculating a first value representing a degree to which characters in said set of training images open toward a first direction;
   calculating a second value representing a degree to which characters in said set of training images open toward a second direction orientated oppositely from said first direction;
   determining, in accordance with said first value and said second value, a direction in which said training images exhibit a dominant directional property, wherein said determining comprises:
   specifying a first direction of interest, wherein an axis of said first direction of interest forms a first angle with respect to a horizontal axis; and
   rotating said set of training images by a second angle, said second angle being a negative of said first angle, to orientate said first direction of interest horizontally;
   initializing a set of character directionality values to an empty set;

calculating, using the processor, for each individual text character in said set of training images, an absolute difference between the first value and the second value; and appending said set of character directionality values by a value of log (ratio of the first value over the second value), if said absolute difference is greater than a predefined fraction of a respective character region of said individual text character; and storing information associating said script and said dominant directional property in a device that performs an orientation correction on documents including text.

2. The method of claim 1, further comprising steps of:

specifying a second direction of interest to investigate if said set of character directionality values is still an empty set;

constructing a first histogram of elements in said set of character directionality values if said set of character directionality values is not empty; and constructing a second histogram, said second histogram being a mirror of said first histogram at log (ratio of the first value over the second value) equals zero.

3. The method of claim 2, further comprising steps of:

concluding that a character directionality as indicated by the ratio of the first value over the second value will not yield an accurate determination of character orientation in said first direction of interest, if an extent to which said first and second histograms overlap exceeds a third predefined threshold; and determining the orientation of said text based on a character directionality as indicated by the ratio of the first value over the second value, if an extent to which said first and second histograms overlap does not exceed the third predefined threshold.

4. The method of claim 3, wherein the third predefined threshold is 0.3.

5. The method of claim 3, further comprising step of:

specifying a third direction of interest to investigate if a character directionality as indicated by the ratio of the first value over the second value will not yield an accurate determination of character orientation in said first direction of interest.

6. A computer readable storage medium containing an executable program for determining a dominant character orientation for a given script, where the program performs steps of:

providing a set of training images of said script;

orientating said set of training images right side up;

calculating a first value representing a degree to which characters in said set of training images open toward a first direction;

calculating a second value representing a degree to which characters in said set of training images open toward a second direction orientated oppositely from said first direction;

determining, in accordance with said first value and said second value, a direction in which said training images exhibit a dominant directional property, wherein said determining comprises:

specifying a first direction of interest, wherein an axis of said first direction of interest forms a first angle with respect to a horizontal axis; and rotating said set of training images by a second angle, said second angle being a negative of said first angle, to orientate said first direction of interest horizontally;

initializing a set of character directionality values to an empty set;

calculating, for each individual text character in said set of training images, an absolute difference between the first value and the second value; and appending said set of character directionality values by a value of log (ratio of the first value over the second value), if said absolute difference is greater than a predefined fraction of a respective character region of said individual text character; and storing information associating said script and said dominant directional property in a device that performs an orientation correction on documents including text.

7. The computer readable medium of claim 6, further comprising steps of:

specifying a second direction of interest to investigate if said set of character directionality values is still an empty set;

constructing a first histogram of elements in said set of character directionality values if said set of character directionality values is not empty; and constructing a second histogram, said second histogram being a mirror of said first histogram at log (ratio of the first value over the second value) equals zero.

8. The computer readable medium of claim 7, further comprising steps of:

concluding that a character directionality as indicated by the ratio of the first value over the second value will not yield an accurate determination of character orientation in said first direction of interest, if an extent to which said first and second histograms overlap exceeds a third predefined threshold; and determining the orientation of said text based on a character directionality as indicated by the ratio of the first value over the second value, if an extent to which said first and second histograms overlap does not exceed the third predefined threshold.

9. The computer readable medium of claim 8, further comprising step of:

specifying a third direction of interest to investigate if a character directionality as indicated by the ratio of the first value over the second value will not yield an accurate determination of character orientation in said first direction of interest.

10. A computer readable medium containing an executable program for determining a dominant character orientation for a given script, where the program performs steps of:

providing a set of training images of said script;

orientating said set of training images right side up;

determining a direction in which said set of training images exhibit a dominant directional property, wherein said determining step comprises:

specifying a first direction of interest, wherein an axis of said first direction of interest forms a first angle with respect to a horizontal axis; and rotating said set of training images by a second angle, said second angle being a negative of said first angle, to orientate said first direction of interest horizontally;

initializing a set of character directionality values to an empty set;

calculating, for each individual text character in said set of training images, an absolute difference between a degree to which said individual text character opens toward a first direction and a degree to which said individual text character opens toward a second direction orientated oppositely from said first direction; and appending said set of character directionality values by a value of log (ratio of the degree to which said individual text character opens toward said first direction over the degree to which said individual text character opens toward said second direction), if said absolute difference is greater than a predefined fraction of a respective character region of said individual text character.

11. The computer readable medium of claim 10, further comprising steps of:
specifying a second direction of interest to investigate if said set of character directionality values is still an empty set;
constructing a first histogram of elements in said set of character directionality values if said set of character directionality values is not empty; and
constructing a second histogram, said second histogram being a mirror of said first histogram at log (ratio of the degree to which said individual text character opens toward said first direction over the degree to which said individual text character opens toward said second direction) equals zero.

12. The computer readable medium of claim 11, further comprising steps of:
concluding that a character directionality as indicated by the ratio of the degree to which said individual text character opens toward said first direction over the degree to which said individual text character opens toward said second direction will not yield an accurate determination of character orientation in said first direction of interest, if an extent to which said first and second histograms overlap exceeds a third predefined threshold; and
determining the orientation of said text based on a character directionality as indicated by the ratio of the degree to which said individual text character opens toward said first direction over the degree to which said individual text character opens toward said second direction, if an extent to which said first and second histograms overlap does not exceed the third predefined threshold.

13. The computer readable medium of claim 12, further comprising step of:
specifying a second direction of interest to investigate if a character directionality as indicated by the ratio of the degree to which said individual text character opens toward said first direction over the degree to which said individual text character opens toward said second direction will not yield an accurate determination of character orientation in said first direction of interest.

* * * * *